US011371809B1

(12) United States Patent
Lo

(10) Patent No.: US 11,371,809 B1
(45) Date of Patent: Jun. 28, 2022

(54) SYSTEMS AND METHODS FOR ADDRESSING TACTICAL SITUATIONS VIA ELECTRONIC AND ROBOTIC DEVICES

(71) Applicant: Elysian Labs, Inc, Oakland, CA (US)

(72) Inventor: Joanne Chung-Yan Lo, Oakland, CA (US)

(73) Assignee: Elysian Labs, Inc, Berkeley, CA (US)

( * ) Notice: Subject to any disclaimer, the term of this patent is extended or adjusted under 35 U.S.C. 154(b) by 109 days.

(21) Appl. No.: 16/736,655

(22) Filed: Jan. 7, 2020

(51) Int. Cl.
*F41H 13/00* (2006.01)
*G06N 7/00* (2006.01)
*G06N 20/00* (2019.01)

(52) U.S. Cl.
CPC .............. *F41H 13/00* (2013.01); *G06N 7/005* (2013.01); *G06N 20/00* (2019.01)

(58) Field of Classification Search
CPC ......... F41H 13/00; G06N 20/00; G06N 7/005
See application file for complete search history.

(56) References Cited

U.S. PATENT DOCUMENTS

| 2015/0131845 | A1* | 5/2015 | Forouhar | ................ G06F 16/71 |
| | | | | 382/100 |
| 2018/0373247 | A1* | 12/2018 | Wang | ...................... F41H 11/00 |
| 2020/0311560 | A1* | 10/2020 | Magin | ................ G06F 16/2455 |

* cited by examiner

*Primary Examiner* — Roy Y Yi
*Assistant Examiner* — Geoffrey T Evans
(74) *Attorney, Agent, or Firm* — FisherBroyles, LLP

(57) ABSTRACT

A method for addressing tactical situations via tactical devices may include (i) observing, via a device associated with an operator, a tactical situation involving the operator, (ii) retrieving, from a set of data about the operator, at least one attribute of the operator that is relevant to the tactical situation, (iii) gathering at least one attribute of the environment of the tactical situation from at least one sensor device monitoring the environment, and (iv) calculating a success probability for a by the operator the addresses the tactical situation based on the at least one attribute of the operator that is relevant to the tactical situation and the at least one attribute of the environment of the tactical situation. Various other systems, and methods are also disclosed.

19 Claims, 14 Drawing Sheets

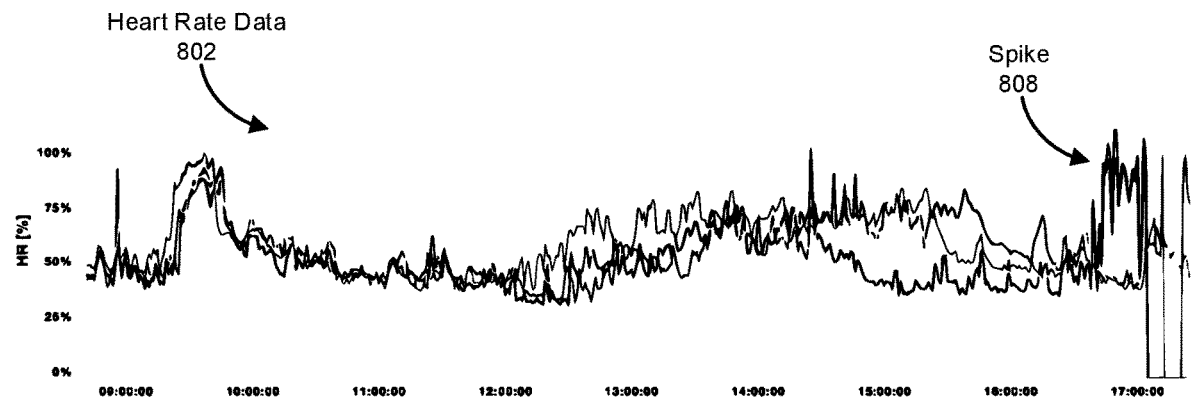
FIG. 8

SYSTEMS AND METHODS FOR ADDRESSING TACTICAL SITUATIONS VIA ELECTRONIC AND ROBOTIC DEVICES

CROSS-REFERENCE TO RELATED APPLICATION

This application claims priority to and the benefit of U.S. Provisional Application No. 62/890,582, which is entitled "SYSTEMS AND METHODS FOR ADDRESSING TACTICAL SITUATIONS VIA TACTICAL DEVICES," and was filed on Aug. 22, 2019, the entire contents of which are incorporated herein by reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is an illustration of example data about a group of operators.

Figure 1:
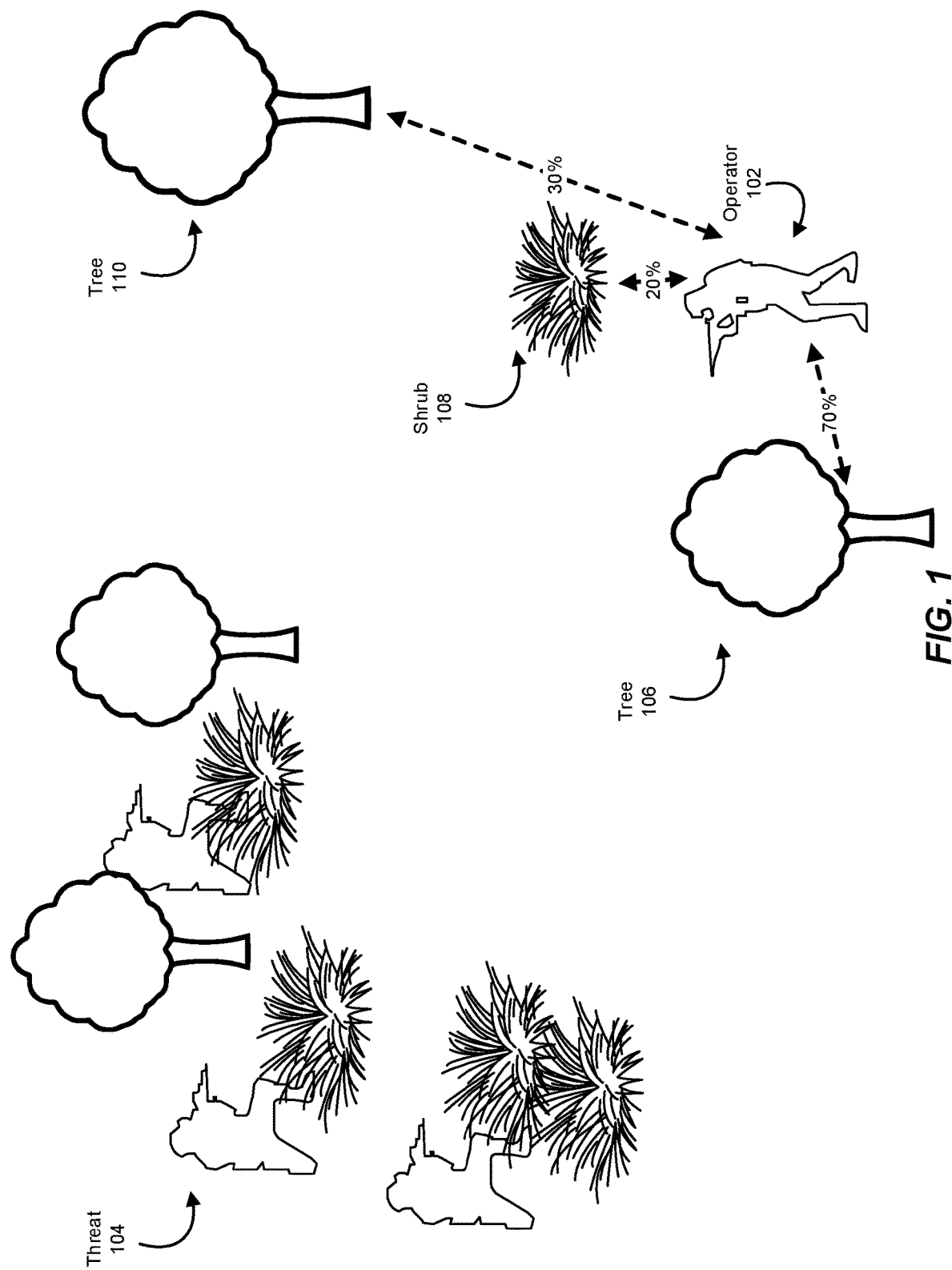
FIG. 1 is an illustration of an example operator in a tactical situation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for tactical devices. As will be explained in greater detail below, a robotic proxy workflow management program may streamline the human-machine interface in a multidomain, rapidly changing, combat environment. Additionally, the systems and methods described herein may facilitate decision-making and/or human-machine interfacing in non-combat environments, such as sports. In some embodiments, the systems and methods described herein may enable operators to build and share customized workflows of devices and robotic systems. In one embodiment, profiles of a workflow may be created and easily disseminated amongst a team of operators as part of the mission package, allowing small units to share a network of devices and robotic proxies with standardized functions within the team. In some embodiments, the systems described herein may gather environmental data surrounding a tactical situation and/or retrieve data about operator capabilities and/or behaviors to calculate the probability of success of various potential actions. In some examples, the systems described herein may use the success probability to display relevant data (e.g., action recommendations) to an operator, team of operators, and/or strategic decision-maker in charge of multiple teams of operators. In some examples, recommendations may include configurations for devices such as drones and/or distributions of resources including drones and other equipment. As discussed in greater detail below, the various embodiments disclosed herein, whether used alone or in combination, may help users efficiently control and/or configure devices and/or perform other actions with a greater probability of success than otherwise.

FIG. 1 is an illustration of an example operator in a tactical situation. In one example, an operator 102 may be involved in a tactical situation, such as a battlefield, that includes at least one threat 104. In some embodiments, the systems described herein may observe the tactical situation via various devices including but not limited to a drone flying overhead, a satellite, a mobile device carried by operator 102, a wearable device worn by operator 102, a stationary sensor device (e.g., a camera and/or microphone), devices worn and/or carried by additional operators and/or vehicles, and/or a combination of the above. In one example, operator 102 may be under fire from threat 104 and may need to move to cover to maximize the chances of survival. In some examples, the systems described herein may determine that based on at least one attribute of operator 102 (e.g., current location, current heart rate, stress level, load carried, injuries, historical movement speed, historical reaction time, etc.) and/or at least one attribute of the environment (e.g., the location and/or type of threat 104, the type and availability of nearby cover, etc.), operator 102 has a 70% chance of survival by taking cover behind tree 106, a 20% chance of survival by taking cover behind shrub 108, and/or a 30% chance of survival by taking cover behind tree 110. The term "environment," as used here, generally refers to conditions and/or characteristics of the tactical situation including but not limited to terrain, weather, obstacles, humans (enemies, allies, and/or neutral), vehicles, robots, drones, objectives, and/or equipment.

In some embodiments, the systems described herein may make calculations based on interactions between attributes. For example, the systems described herein may retrieve, from a wearable device that monitors biometrics, stress data for operator 102 (e.g., heart rate, cortisol levels, etc.) and may also retrieve from a server, information about the typical reaction time of operator 102 when under stress (as opposed to when not under stress), in order to determine an expected reaction time of operator 102. The systems described herein may then use the expected reaction time in to calculate the likelihood of operator 102 safely traversing the distance to tree 106 and/or tree 110. In some embodiments, the systems described herein may categorize operator attributes as physical, mental, and morale. Physical attributes may include, without limitation, strength, speed at performing various physical actions (e.g., running, dropping to the ground, dropping a weapon), and/or agility. Mental attributes may include, without limitation, decision-making speed, stress level, information processing speed (e.g., ability to quickly identify tree 106 as potential cover), personality attributes (e.g., as measured by a psychological test), and/or problem-solving ability. Morale attributes may include, without limitation, self-awareness and/or adaptability. In some examples, morale may be measured by physiological responses, condition and/or configuration of equipment (e.g., an operator in combat equipped with an M4 is likely to have higher morale than an operator in combat equipped with only a pistol), team cohesion of a team of which the operator is a part, and/or leadership support.

The systems described herein may calculate the success probabilities of the different potential actions in a variety of contexts. For example, operator 102 may query the systems described herein (e.g., by pressing a button on a device, issuing a voice command, and/or otherwise interacting with a device) about the best course of action and the systems described herein may indicate that operator 102 has the highest survival chance by taking cover behind tree 106. In another example, operator 102 may indicate tree 106 and tree 110 to the systems described herein and the systems described herein may convey that tree 106 is a more optimal survival choice than tree 110. Additionally or alternatively, the systems described herein may detect threat 104 (e.g., visually via a camera on a device and/or audibly via hearing movement and/or gunshots via a microphone on a device) and may automatically provide operator 102 with the recommendation to take cover behind tree 106 without being queried by operator 102.

In some embodiments, the systems described herein may calculate the success probability of a potential action using one or more linear equations. For example, the systems described herein may determine that the probability of neutralizing an adversary is equal to a function of the marksmanship of operator 102 times the opacity of obstacles between operator 102 and the adversary. In some examples, the probability of neutralizing the adversary and the opacity of the obstacles may both be measured over time (e.g., as operator 102 moves around obstacles and/or obstacles are destroyed). In some embodiments, the systems described herein may simplify equations by applying constants. For example, the systems described herein may assume that three hits to center mass equals a neutralize when calculating whether a series of observed and/or predicted hits is likely to neutralize an adversary. In one embodiment, the systems described herein may determine that the probability for neutralizing the adversary successfully is equal to the probability of operator 102 neutralizing the adversary minus the probability of the adversary neutralizing operator 102.

The systems described herein may surface information and/or recommendations in a variety of ways. For example, if the systems described herein detect that operator 102 is equipped with a heads-up display (HUD), the systems described herein may display the recommendation to take cover behind tree 106 in the HUD (e.g., by highlighting tree 106, displaying an arrow to tree 106, and/or displaying text). In another example, if the systems described herein detect that operator 102 is not equipped with a HUD and/or is equipped with a headset, the systems described herein may output information via speakers in the headset. In some embodiments, the systems described herein may track the networked devices associated with operator 102 and/or preferences of operator 102 for information delivery via devices. In some embodiments, the systems described herein may surface percentages directly to operator 102. Additionally or alternatively, the systems described herein may surface information and/or recommendations based on success percentages but may not surface the percentages explicitly.

In some embodiments, the systems described herein may record the decisions and/or actions of operator 102 to improve future calculations. For example, if operator 102 reaches tree 106 more quickly than predicted, the systems described herein may update a stored metric related to the sprinting speed of operator 102 and/or a heuristic for determining whether to advise operator 102 and/or operators with similar characteristics to sprint to cover in future situations. In another example, if operator 102 takes cover behind shrub 108 and successfully clears threat 104, the systems described herein may reevaluate the effectiveness of taking cover behind shrubs when dealing with threats and/or may be more likely to suggest taking cover behind shrubs in the future.

Figure 2:
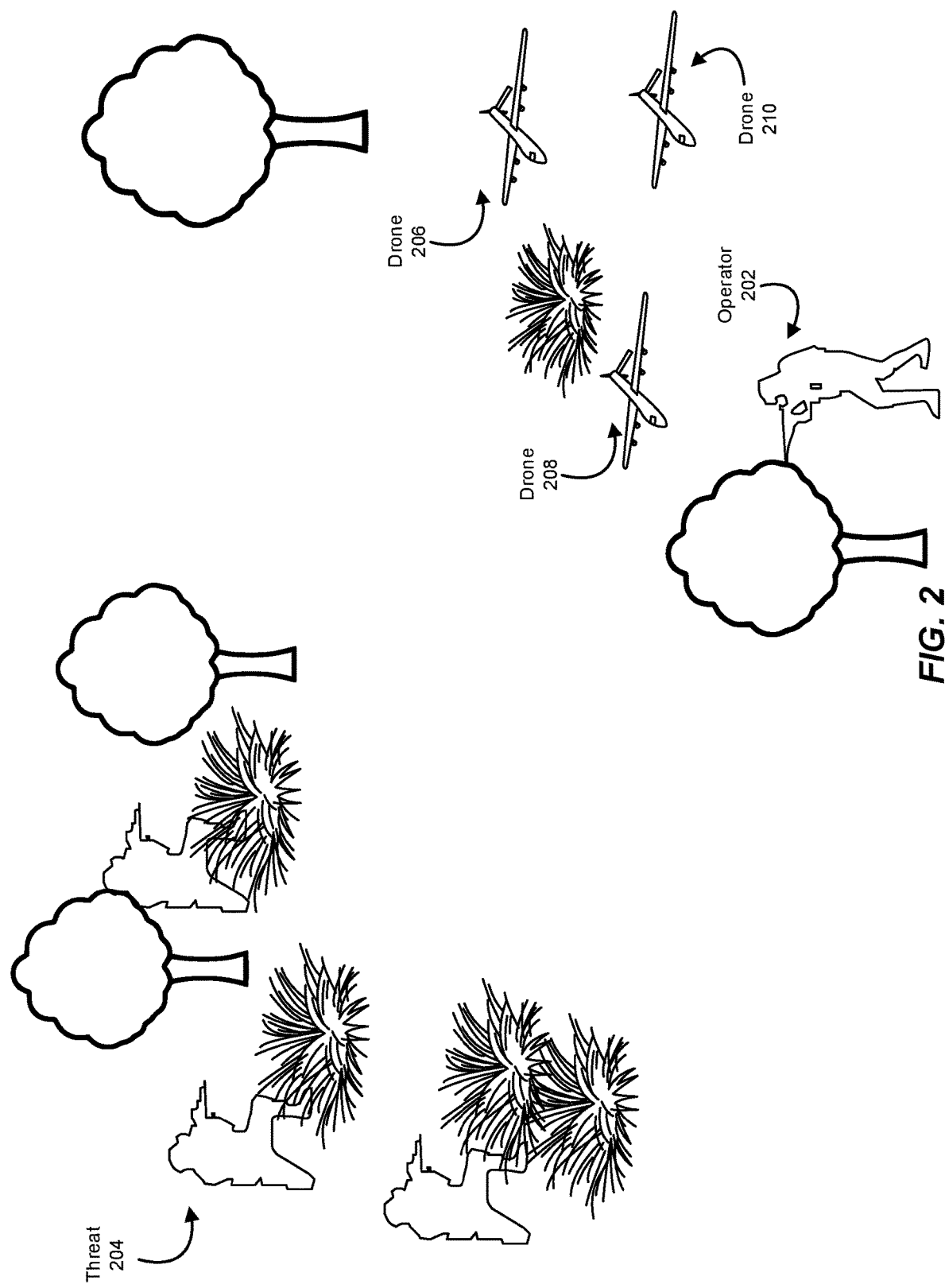
FIG. 2 is an illustration of an example operator in a tactical situation.

FIG. 2 is an illustration of an example operator in a tactical situation. In one example, an operator 202 may be in a tactical situation involving a threat 204. In some examples, drones 206, 208, and/or 210 may be in range of one or more devices operated by operator 202. In one example, operator 202 may request to be allocated one or more drones and the systems described herein may determine, based on at least one attribute of operator 202 and/or the environment of the tactical situation, that the success percentage for operator 202 performing an action (e.g., clearing threat 204) increases sufficiently with the addition of one or more drones to justify allocating one or more of drones 206, 208, and/or 210 to operator 202. Additionally or alternatively, operator 202 may query the systems described herein about the success probability of operator 202 performing a potential action, such as running across the open ground to engage threat 204. In one example, the systems described herein may determine that the success percentage of operator 202 engaging threat 204 without additional resources is unacceptably low (e.g., below a predefined threshold for success) and may suggest that operator 202 employ drones 206, 208, and/or 210 while engaging threat 204. In some embodiments, the systems described herein may then recalculate the success percentage for operator 202 engaging threat 204 with assistance from drones 206, 208, and/or 210. In one embodiment, the systems described herein may perform the initial assessment by querying a server configured with a machine learning model and may perform one or more follow-up assessments using edge computing (e.g., devices carried and/or worn by operator 202 and/or connected on a local network). In some embodiments, the systems described herein may perform the initial assessment via a machine learning model and/or may perform the follow-up assessment using a model-free approach.

In some examples, drones 206, 208, and/or 210 may already be allocated to operator 202 and operator 202 may query the systems described herein (e.g., via a mobile device) about the optimal configuration of drones 206, 208, and/or 210 for accomplishing a given potential action, such as engaging threat 204. In one example, operator 202 may query the systems described herein. Additionally or alternatively, the systems described herein may detect that operator 202 is planning to engage threat 204 (e.g., based on the movement of operator 202) and may suggest a drone formation. In some embodiments, the systems described herein may make suggestions about allocating and/or deploying various types of tactical resources, including but not limited to drones, robots, weaponry, vehicles, and/or equipment.

In some embodiment, the systems described herein may evaluate the impact of technology on the actions and/or success of operator 202 in order to formulate future recommendations for the deployment and/or usage of technology. In some examples, the systems described herein may observe various characteristics of technology (e.g., durability, weapon configuration, speed, etc.) and the impact of those characteristics on the outcomes of actions involving the technology. For example, the systems described herein may observe drone 206 assisting operator 202 in clearing threat 204 and may determine that a faster model of drone would have been more effective. In this example, the systems described herein may recommend that a strategic decision-maker acquire and/or deploy a different model of drone in the future and/or may adjust recommendations to operators about which drones to deploy.

Figure 3:
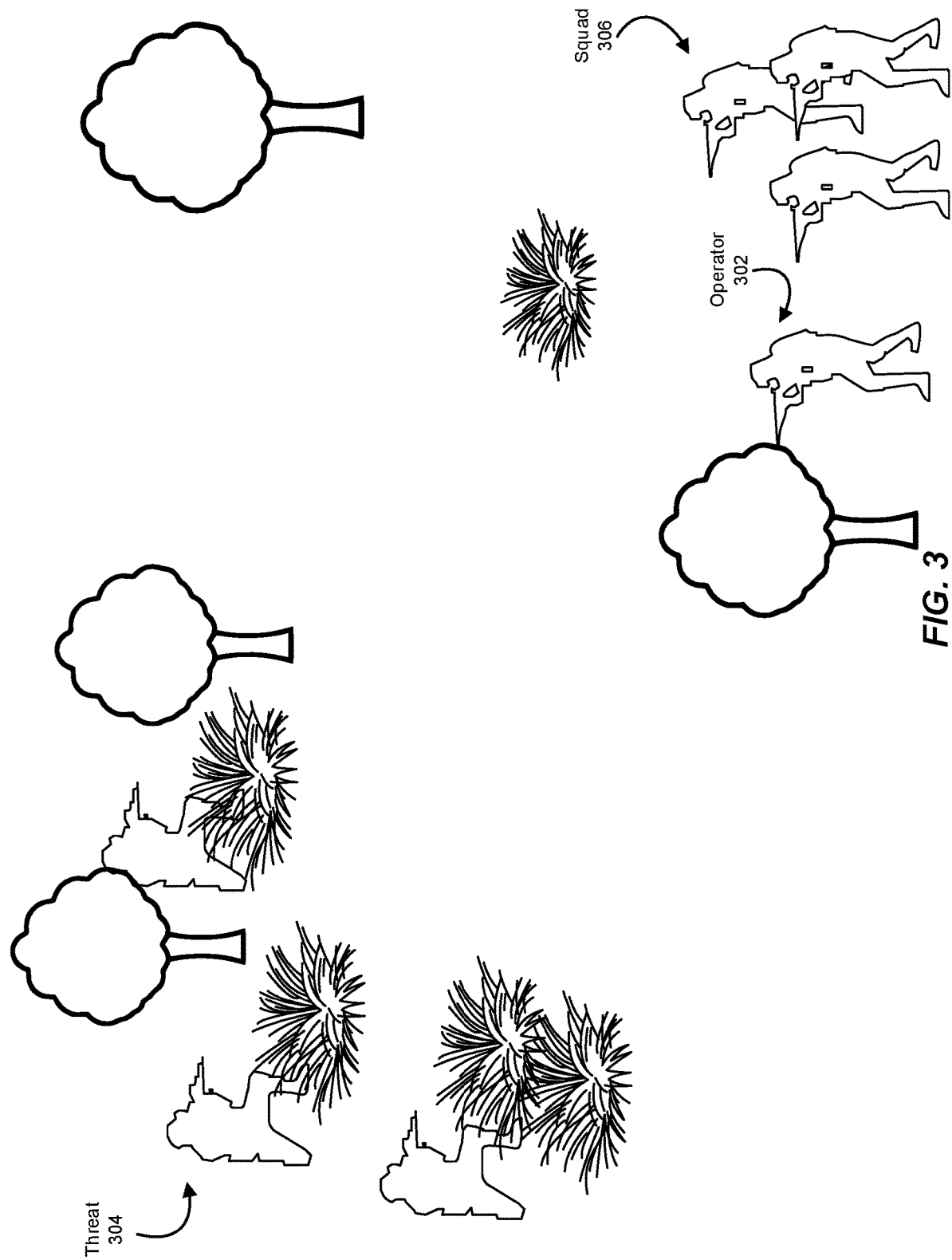
FIG. 3 is an illustration of an example group of operators in a tactical situation.

FIG. 3 is an illustration of an example group of operators in a tactical situation. In some examples, an operator 302 may be part of a squad 306 of operators who collaborate to achieve objectives in a tactical situation. In some embodiments, the systems described herein may store and/or model data about the performance of squad 306 as a team in order to make predictions about the success probability of a potential action by squad 306. For example, squad 306 may excel at traversing difficult terrain as a group but may not perform well in situations involving flanking maneuvers. In some embodiments, the systems described herein may use information about the performance of squad 306 as a team in addition to information about individual operators within squad 306 (e.g., average running speed, marksmanship abilities, etc.) to calculate a success probability for a potential action, such as engaging threat 304 via a frontal assault. In some embodiments, the systems described herein may surface information about members of squad 306 to a leader of squad 306 in order to facilitate tactical decision-making by the squad leader. For example, the systems described herein may display information about the heart rates of the operators in squad 306 on a HUD of the squad leader in order to help the squad leader assess the current physical condition of the members of squad 306.

Figure 4:
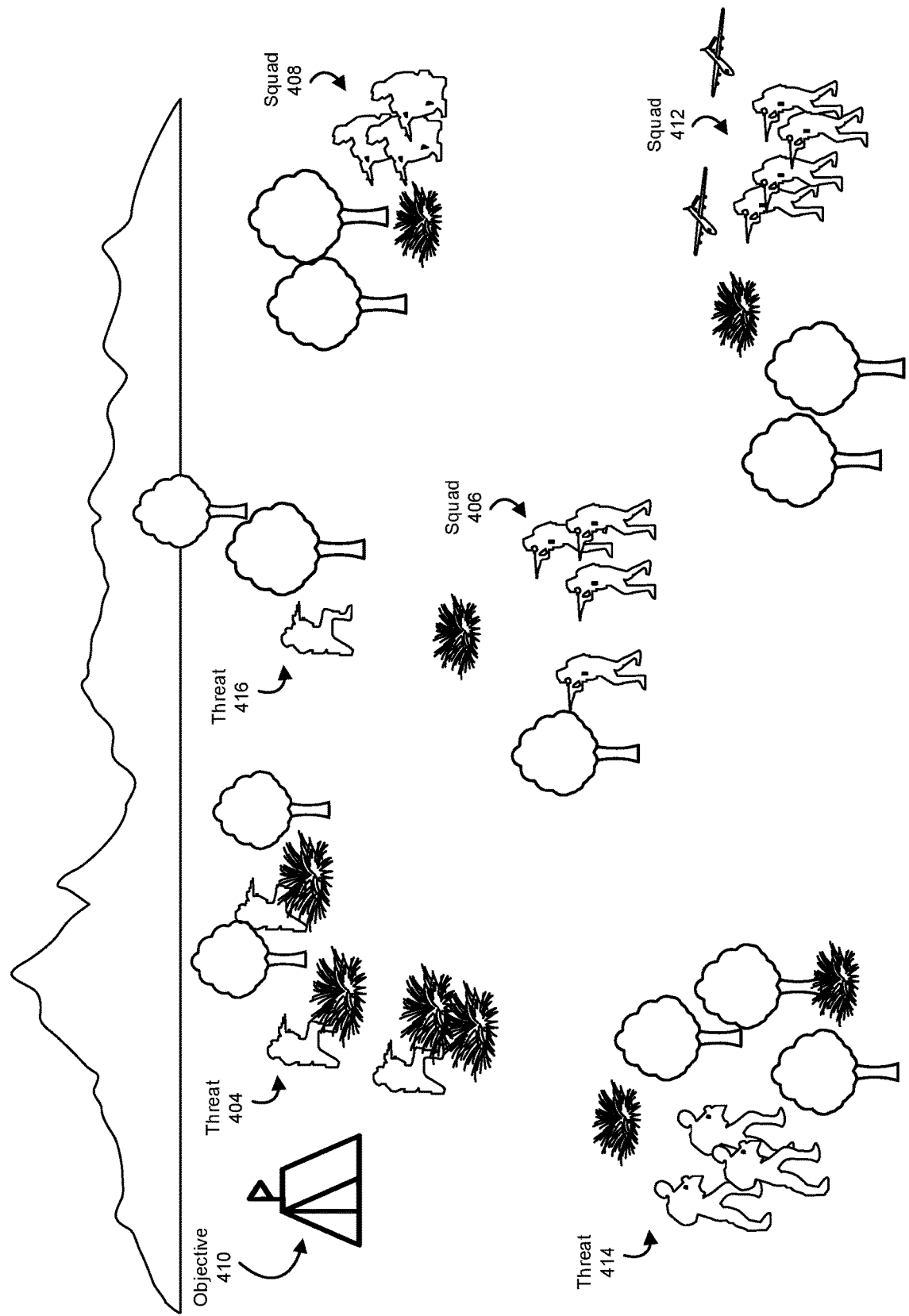
FIG. 4 is an illustration of multiple example groups of operators in a tactical situation.

FIG. 4 is an illustration of multiple example groups of operators in a tactical situation. In one example, squads 406, 408, and/or 412 may be involved in a tactical situation with the goal of securing an objective 410 despite interference from threats 404, 414, and/or 416. In some examples, different squads may have different capabilities and/or tactical resources. For example, squad 406 may be light infantry, squad 408 may be heavy gunners, and/or squad 412 may have drones. In some embodiments, the systems described herein may retrieve information about the tactical situation from a variety of devices (e.g., devices worn and/or carried by operators, drones, robots, stationary sensors, satellites, and/or vehicles), combine this information with historical information (e.g., performance of individual operators and/or squads during training and/or similar previous engagements, stored attributes of operators and/or squads, capabilities of deployed equipment and/or resources, etc.), and use a machine learning model to determine the success probabilities of various actions by individual operators and/or any or all of squads 406, 408, and/or 412 operating in concert. Additionally or alternatively, the systems described herein may use a model-free algorithm to process the data to generate success probabilities and/or recommendations. In one embodiment, the systems described herein may surface success probabilities and/or recommendations to a strategic decision-maker who may not be physically present within the tactical situation. For example, the systems described herein may present information and/or recommendations to a commander in order to facilitate strategic decision-making by the commander to achieve the objective.

Figure 5:
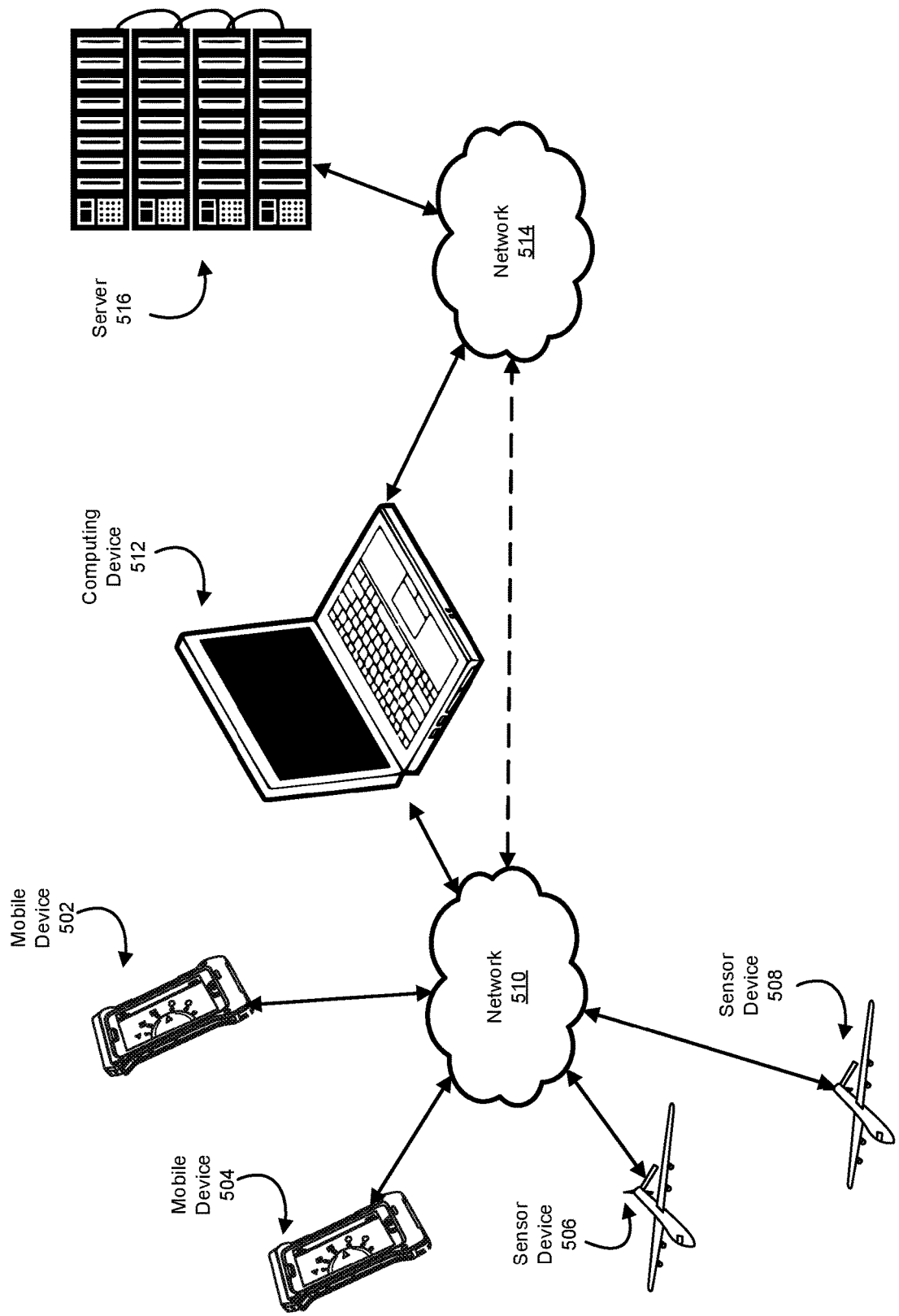
FIG. 5 is an illustration of an example system for addressing tactical situations via tactical devices.

FIG. 5 is an illustration of an example system for addressing tactical situations via tactical devices. In one embodiment, multiple devices associated with operators, such as mobile device 502 and/or 504, may communicate via a network 510. In some embodiments, network 510 may be a local area network. In some examples, additional devices not associated with an individual operator, such as sensor device 506 and/or sensor device 508, may also communicate via network 510. In some examples, additional devices, including wearable devices worn by operators, vehicles, drones, robots, and/or stationary sensors may be connected to network 510. In some embodiments, devices connected to network 510, such as mobile device 502, may also communicate with a network 514. In some embodiments, network 514 may include the Internet. In one embodiment, a server 516 may communicate with mobile device 502 via network 514 an/or network 510. Additionally or alternatively, one or more devices on network 510 may communicate with a computing device 512 that may also communicate with server 516.

For example, mobile device 502 may be associated with an operator in a tactical situation. If the operator is making a relatively simple decision, such as whether to dash across an open space to cover, the systems described herein may use data and/or processing power from other devices connected to network 510 to calculate a success probability without communicating with computing device 512 and/or server 516. If the operator is making a more complex decision, the systems described herein may retrieve data from server 516 and/or use a machine learning model hosted by server 516 to calculate the success probability. In another example, if a commander associated with computing device 512 is making a strategic decision involving multiple squads of operators, computing device 512 may query devices connected to network 510 to retrieve data about the tactical situation and/or may query server 516 to retrieve historical data and/or execute a machine learning model in order to calculate a success probability of one or more potential actions. In some embodiments, the machine learning model may record a decision made by the strategic decision-maker (e.g., by receiving data from computing device 512) and use that information to improve future predictions and/or recommendations. In some examples, mobile devices 502 and/or 504 and/or sensor devices 506 and/or 508 may be physically located in a tactical situation (e.g., a theater of operations) while computing device 512 may be located several miles away (e.g., at a command post) and/or server 516 may be located hundreds or thousands of miles away. Although illustrated as a single server, in some embodiments, server 516 may represent multiple physical and/or virtual (e.g., cloud) servers. In some examples, the systems described herein may calculate success probabilities and/or make recommendations for a future tactical situation. For example, if an operator is injured but is needed for an upcoming patrol, the systems described herein may recommend outfitting the operator with a powered exoskeleton to maximize the operator's chances of successfully completing the patrol.

In some embodiments, the systems described herein may detect that a connection to network 514 and/or server 516 is not present and may calculate success probabilities locally with a lower confidence level. For example, if the systems described herein are capable of calculating a success probability of a particular action with 90% confidence with access to the data and/or machine learning model on server 516, the systems described herein may be capable of calculating the success probability of the action with a 30% confidence level using only the data and/or computing power available to devices connected to network 514 (e.g., smartphones, laptops, drones, smart watches, tablets, etc.). In some embodiments, the systems described may handle sparse data robustly. For example, the systems described herein may be configured to store several dozen data points about an individual operator's physical capabilities (e.g., sprinting speed, maximum load, speed while carrying maximum load, etc.) but may make lower-confidence-level predictions and/or recommendations about tactical situations involving the operator with access to only a few of the expected data points. Similarly, the systems described herein may calculate success probabilities with varying levels of confidence based on sparse environmental data about the tactical situation.

Figure 6:
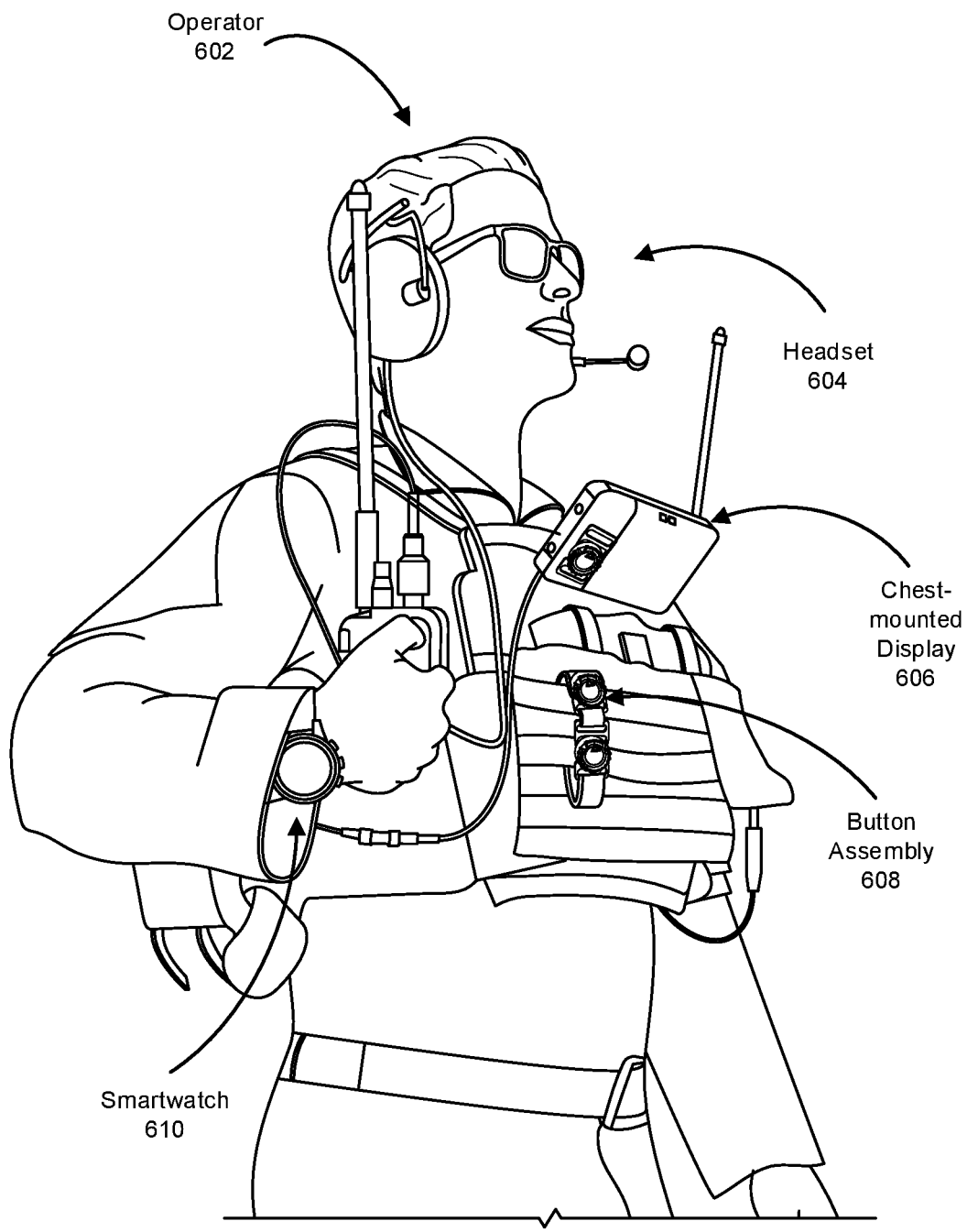
FIG. 6 is an illustration of example devices associated with an operator.

FIG. 6 is an illustration of example devices associated with an operator. In one embodiment, an operator 602 may be equipped with a headset 604 that receives audio input via a microphone and/or produces audio output via speakers. In some embodiments, headset 604 may include glasses that display information. In some examples, operator 602 may be equipped with a chest-mounted display 606 that may function as a HUD and may include a mobile phone and/or tablet. In one example, operator 602 may be equipped with one or more button assemblies such as button assembly 608 that may enable operator 602 to conveniently interact with other devices (e.g., by changing settings, sending messages, etc.). In some examples, operator 602 may be equipped with a smartwatch 610 that may monitor biometric data such as heart rate. In some embodiments, headset 604, chest-mounted display 606, button assembly 608, and/or smartwatch 610 may all be networked (e.g., via network 510 in FIG. 5) with one another and/or other devices worn and/or operated by other operators. In one example, the systems described herein may use data gathered by headset 604, chest-mounted display 606, button assembly 608, and/or smartwatch 610 to calculate the success probability of a potential action. In some examples, the systems described herein may use headset 604, chest-mounted display 606, and/or smartwatch 610 to convey information to operator 602.

Figure 7:
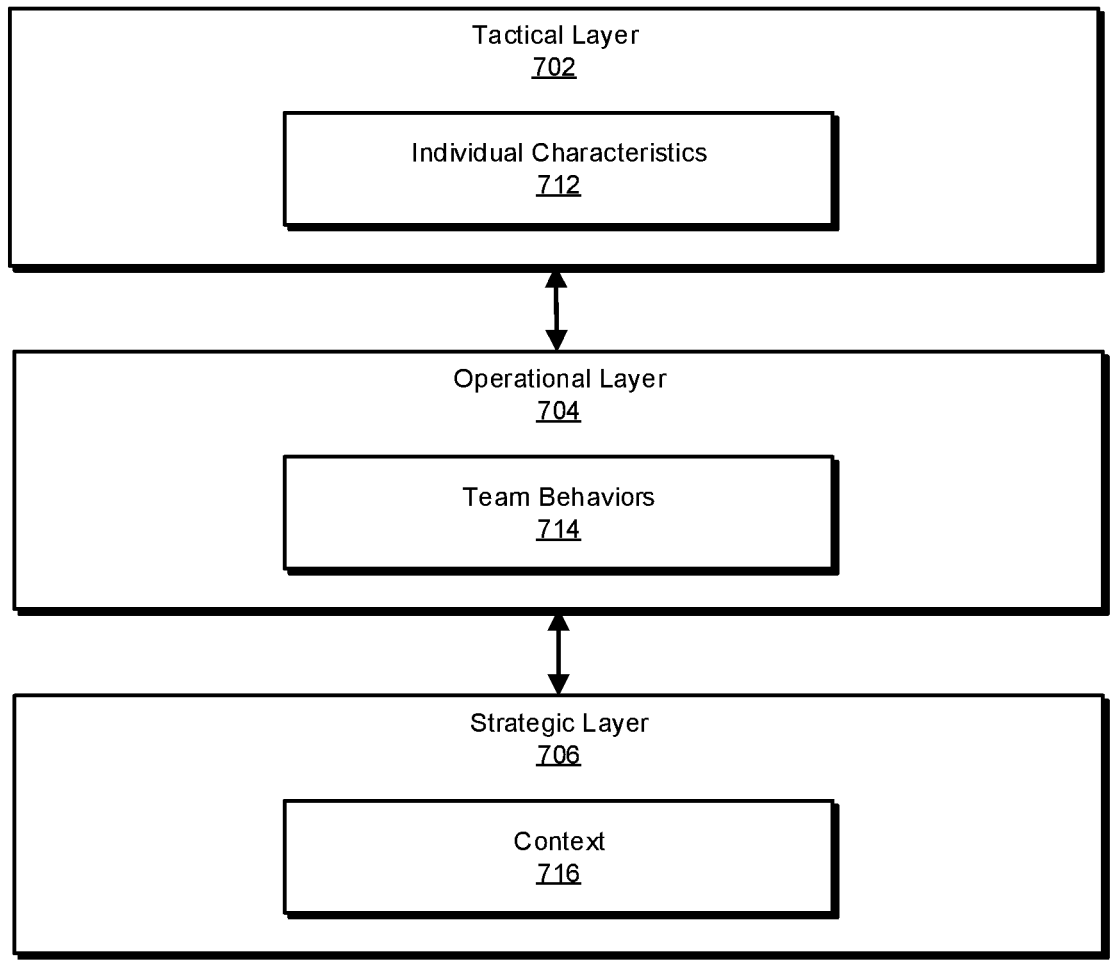
FIG. 7 is a block diagram of an example system for addressing tactical situations via tactical devices.

FIG. 7 is a block diagram of an example system for addressing tactical situations via tactical devices. In some embodiments, the systems described herein may be visualized as operating in three layers: a tactical layer 702, an operational layer 704, and/or a strategic layer 706. In one embodiment, tactical layer 702 may include individual characteristics 712, such as the physical, mental, and/or morale characteristics of operators, operational layer 704 may include team behaviors 714, such as the recorded metrics and/or current status of a squad, and/or strategic layer 706 may include context 716, such as the environmental conditions of a tactical situation, reserves of strategic resources, and/or overall logistics. In some embodiments, information may be displayed to operators based on the three layers. For example, the systems described herein may only surface information relevant to tactical layer 702 to an operator using a mobile device and may instead surface information related to strategic layer 706 to a commander. In one example, the systems described herein may show the commander a statistic indicating an overall physical readiness of a squad but may not explicitly surface information like the heart rate of an individual operator unless specifically requested. In some embodiments, the systems described herein may use the same data structures, hardware, and/or machine learning model for each of the three layers. In some embodiments, connections between the three layers may be modeled via a neural network.

FIG. 8 is an illustration of example data about a group of operators. In some embodiments, the systems described herein may record data during training exercises in order to more accurately predict the potential success of various potential actions. For example, the systems described herein may record heart rate data 802 while a group of operators are moving along route 806 in map 804. In some examples, the systems described herein may record that the operators have relatively low heart rates while moving but the heart rates of the operators spike while encountering a simulated adversary. In one example, the systems described herein may observe a spike 808 in the heart rate of an operator who is not typically assigned to this squad of operators while the heart rates of the other operators remain comparatively low. In some embodiments, the systems described herein may use this data to determine that operators with unfamiliar squads are likely to function less well in stressful situations than operators with familiar squads (e.g., may have a lower morale attribute) and therefore have a lower probability of successfully carrying out various actions. In some embodiments, the systems described herein may individually train a machine learning model for each operator based on training and/or engagement data. Additionally or alternatively, the systems described herein may train a machine learning model for each squad.

Figure 9:
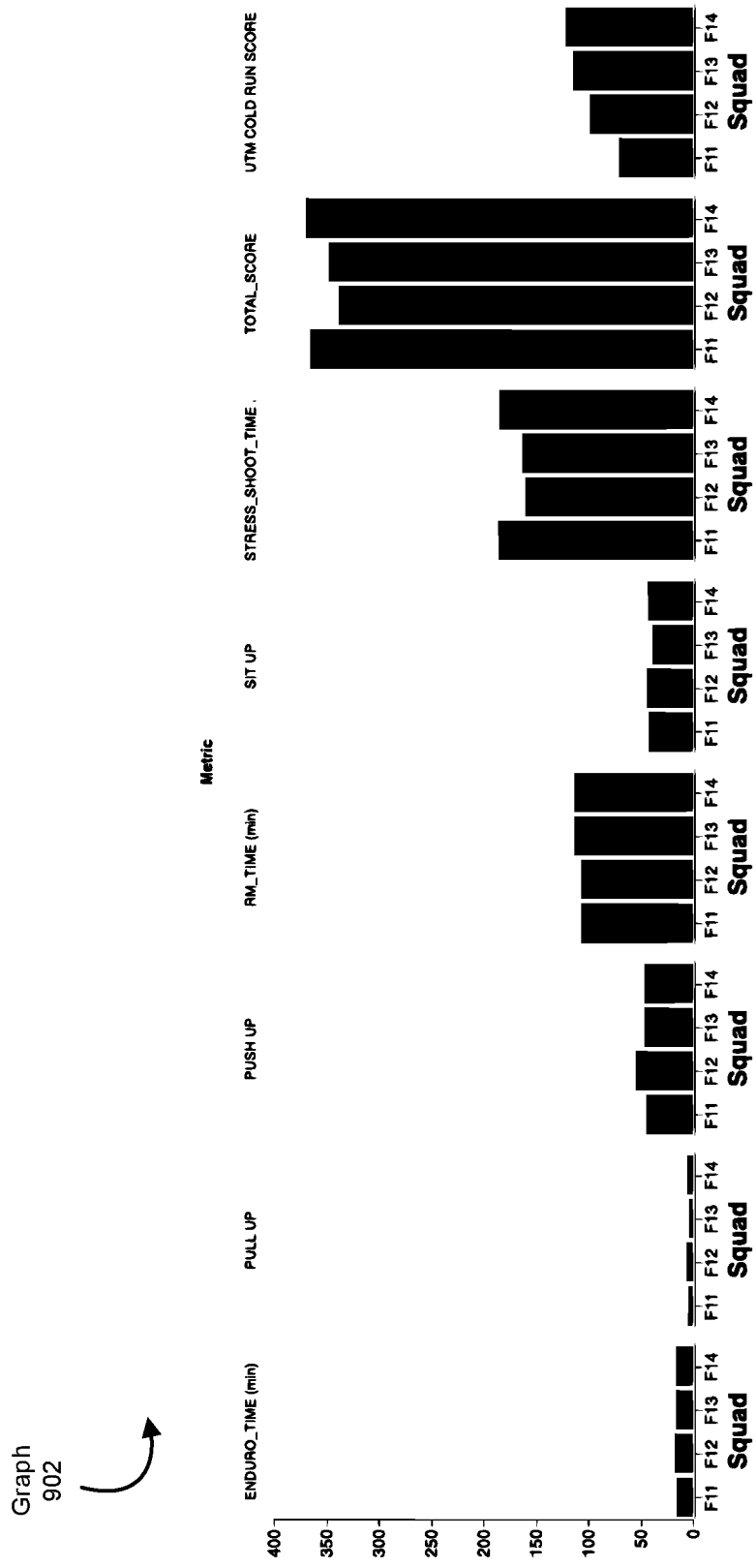
FIG. 9 is an illustration of example data about a group of operators.

FIG. 9 is an illustration of example data about a group of operators. In some examples, the systems described herein may collect training and/or engagement data about how squads perform as a team in order to facilitate decision-making by a commander. In one example, graph 902 may illustrate data collected about four different squads over the course of several days of training exercises. In some embodiments, the systems described herein may use this data to make recommendations about how to deploy squads effectively and/or the success probabilities of different squads for achieving different objectives. For example, one squad may have a higher probability of succeeding at a potential action that requires marksmanship while another squad may have a higher probability of succeeding at a potential action that involves sprinting. In some embodiments, the systems described herein may formulate training recommendations based on data collected about operators and/or squads.

Figure 10:
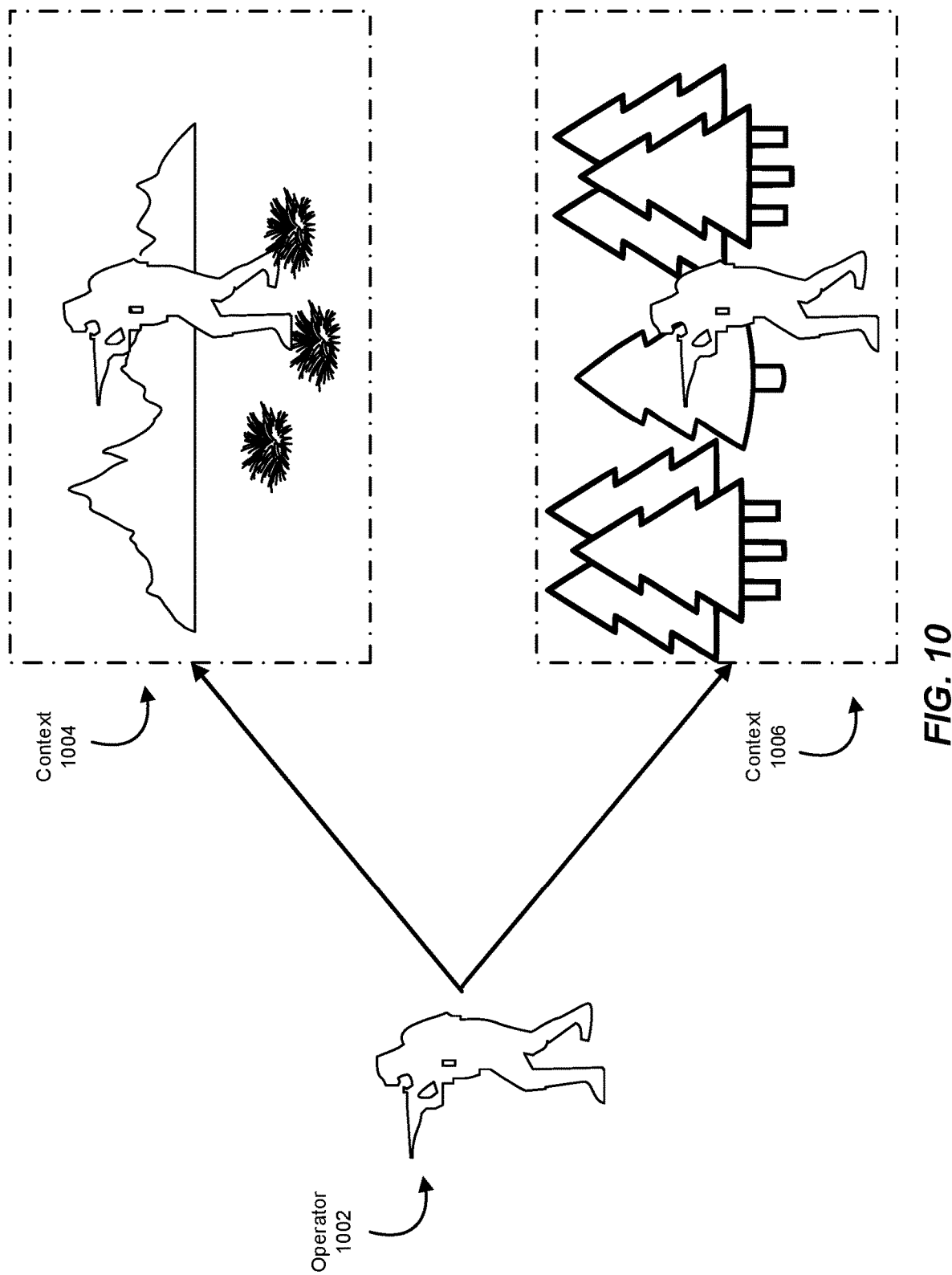
FIG. 10 is an illustration of an example operator in different environments.

FIG. 10 is an illustration of an example operator in different environments. In some embodiments, the systems described herein may track the performance of operators in different environmental contexts in order to increase the accuracy of predictions made about success probabilities. For example, the systems described herein may have training data about an operator 1002 operating in both a context 1004 that involves hot weather and minimal obstacles and a context 1006 that involves cold weather and significant obstacles. In one example, the systems described herein may observe that operator 1002 is capable of carrying significantly more weight for longer periods of time in context 1006 than in context 1004. Therefore, the systems described herein may recommend a different equipment load-out for operator 1002 in the future for a deployment in context 1004 than in context 1006. In another example, the systems described herein may determine that operator 1002 can cover ground more quickly in context 1004 than in context 1006 and may calculate a different success probability for a potential action involving sprinting in context 1004 versus context 1006.

Figure 11:
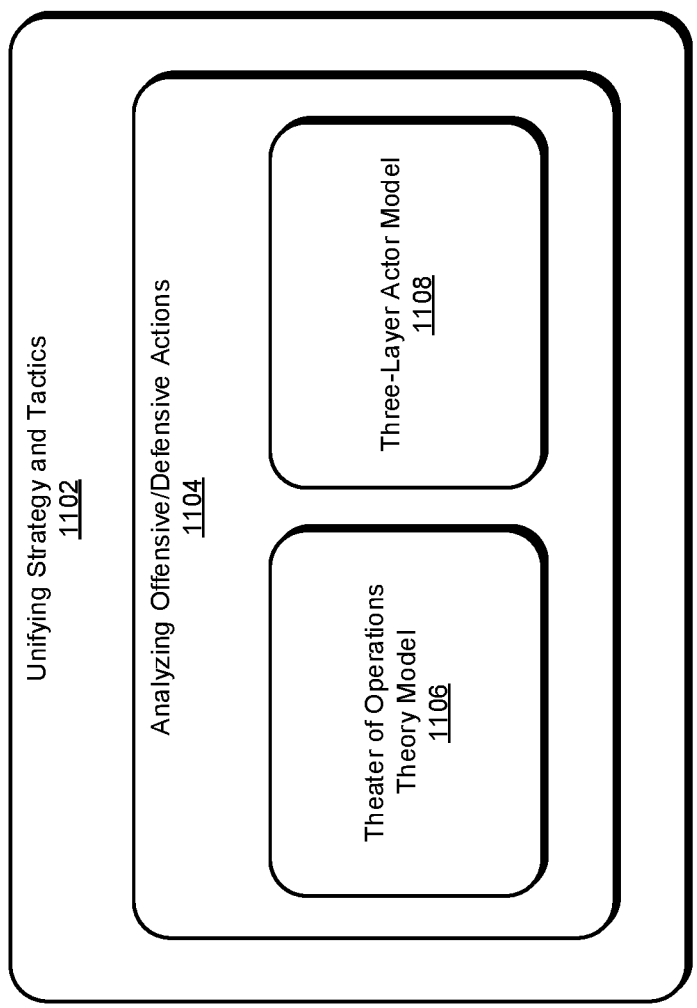
FIG. 11 is a block illustration of a model for addressing tactical situations via tactical devices.

FIG. 11 is a block diagram of an example model for addressing tactical situations via tactical devices. In some embodiments, a system for addressing tactical situations via tactical devices may be based on a theoretical model that incorporates unifying strategy and tactics 1102 to facilitate in analyzing offensive and/or defense actions 1104 in order to produce theater of operations theory model 1106 and/or three-layer actor model 1108. In some embodiments, unifying strategy and tactics may enable the systems described herein to produce better heuristics and/or recommendations for battlefield actions. In some examples, analyzing offensive and/or defensive actions in conflict may facilitate the creation of models, heuristics, and other decision-making elements of the systems described herein. In some embodiments, the systems described herein may apply pattern recognition to data on offensive and/or defensive actions to facilitate predictive analysis. In one embodiment, the systems described herein may use a theater of operations theory model that accounts for factors such as time and space (e.g., range) in physical, mental, and/or morale domains. In some examples, the systems described herein may organize data into a three-layer actor model, such as the model illustrated in FIG. 7.

Figure 12:
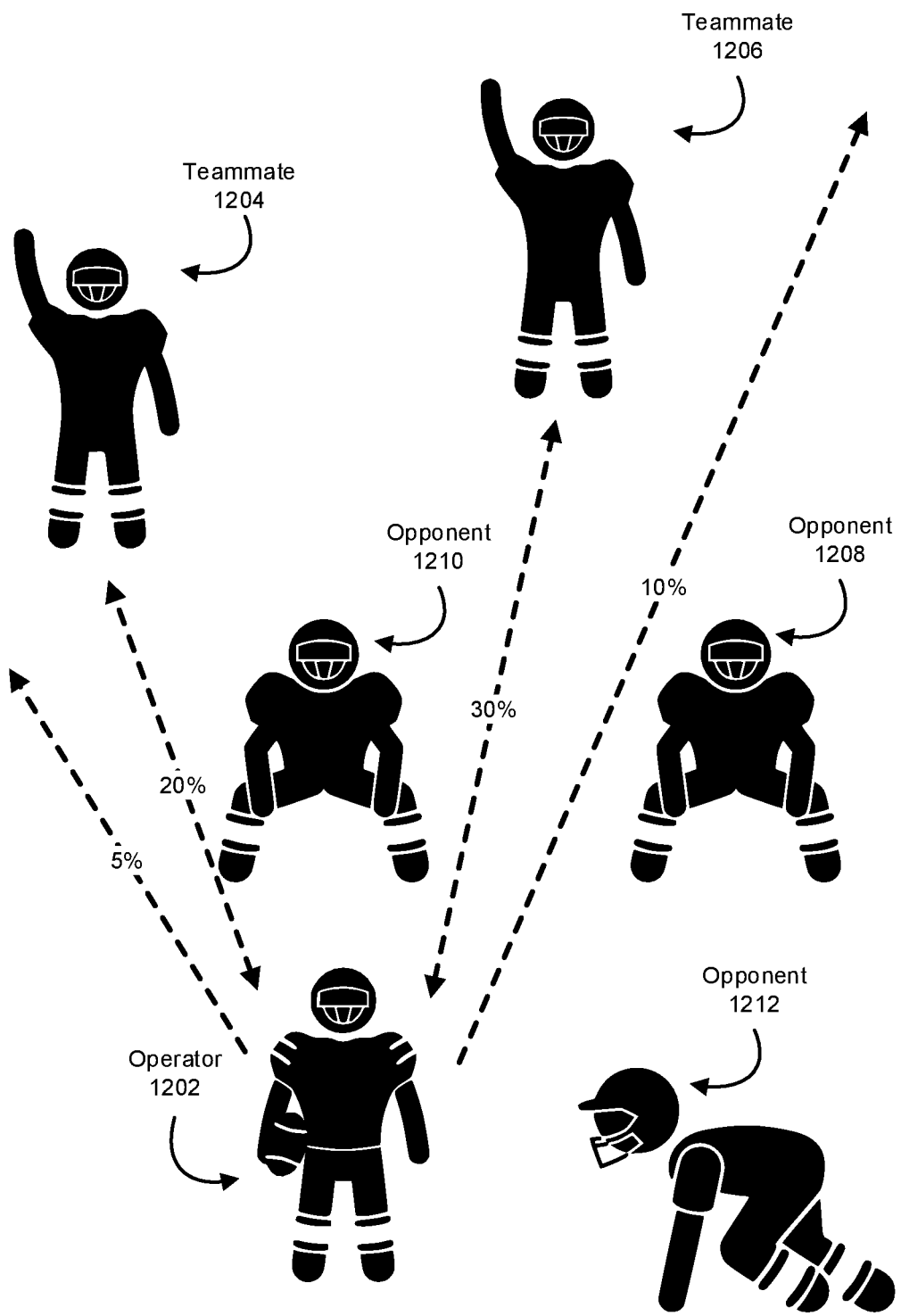
FIG. 12 is an illustration of an example operator in an athletic context.

FIG. 12 is an illustration of an example operator in an athletic context. Although primarily discussed above in the context of warfare, the systems described herein may have a variety of other applications. For example, the systems described herein may calculate success probabilities and/or provide recommendations for potential actions undertaken by individuals or groups in an athletic context. In one example, an operator 1202 may be in possession of a football and may be attempting to convey the football to the endzone. In this example, the tactical situation may include opponents 1208, 1210, and/or 1212, and/or teammates 1204 and/or 1206. In one example, the systems described herein may determine that operator 1202 has a 30% chance of advancing the football by passing to teammate 1206, a 20% chance by passing to teammate 1204, a 10% chance by running the ball down the middle of the field, and/or a 5% chance by running the ball down the outside of the field. In some embodiments, operator 1202 may be equipped with a device, such as a helmet-mounted wearable device. Additionally or alternatively, the systems described herein may include a device operated by a coach on the sidelines.

Figure 13:
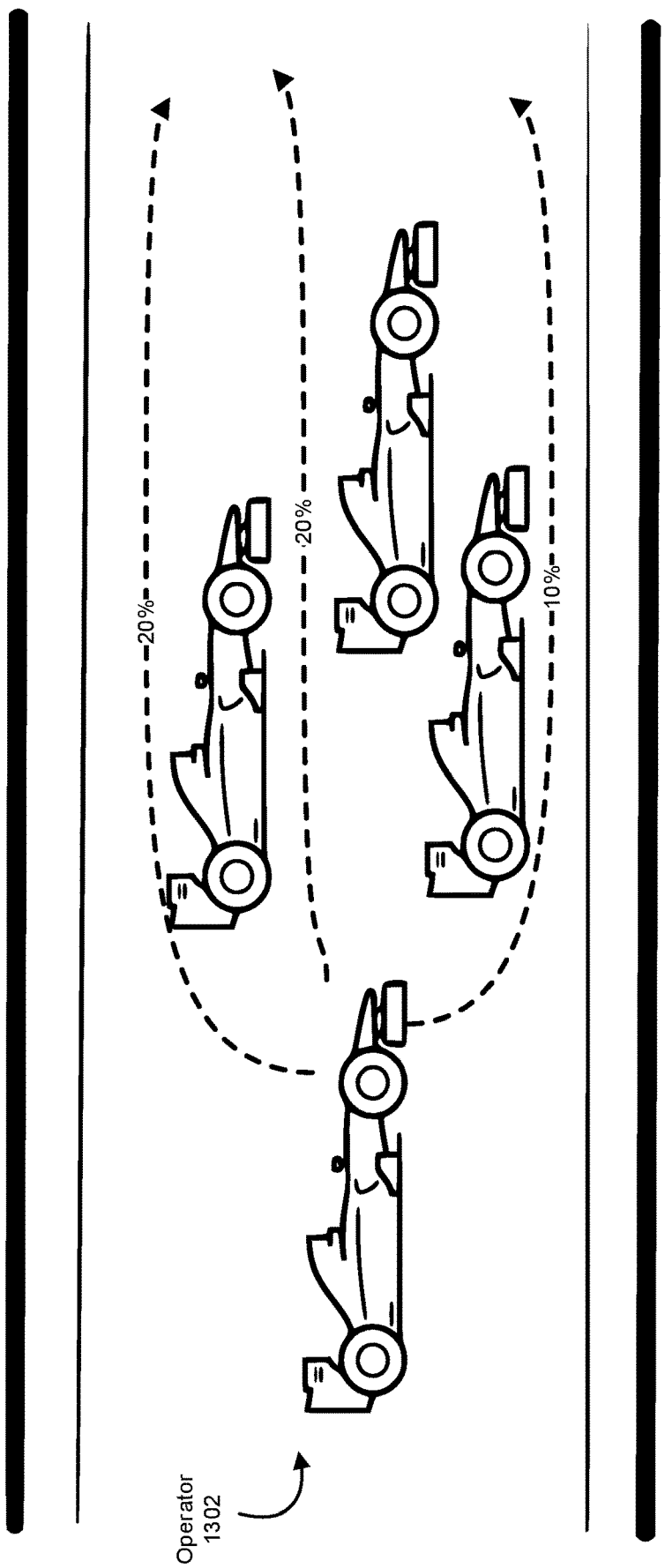
FIG. 13 is an illustration of an example operator in a racing context.

FIG. 13 is an illustration of an example operator in a racing context. In one embodiment, the systems described herein may include an onboard computer and/or sensors in a race car. In one example, the systems described herein may determine that operator 1302 has a 20% chance of passing on the left, a 20% chance of passing down the center, and a 10% chance of passing on the right. In some examples, the systems described herein may recommend that operator 1302 wait for a better time to pass.

Figure 14:
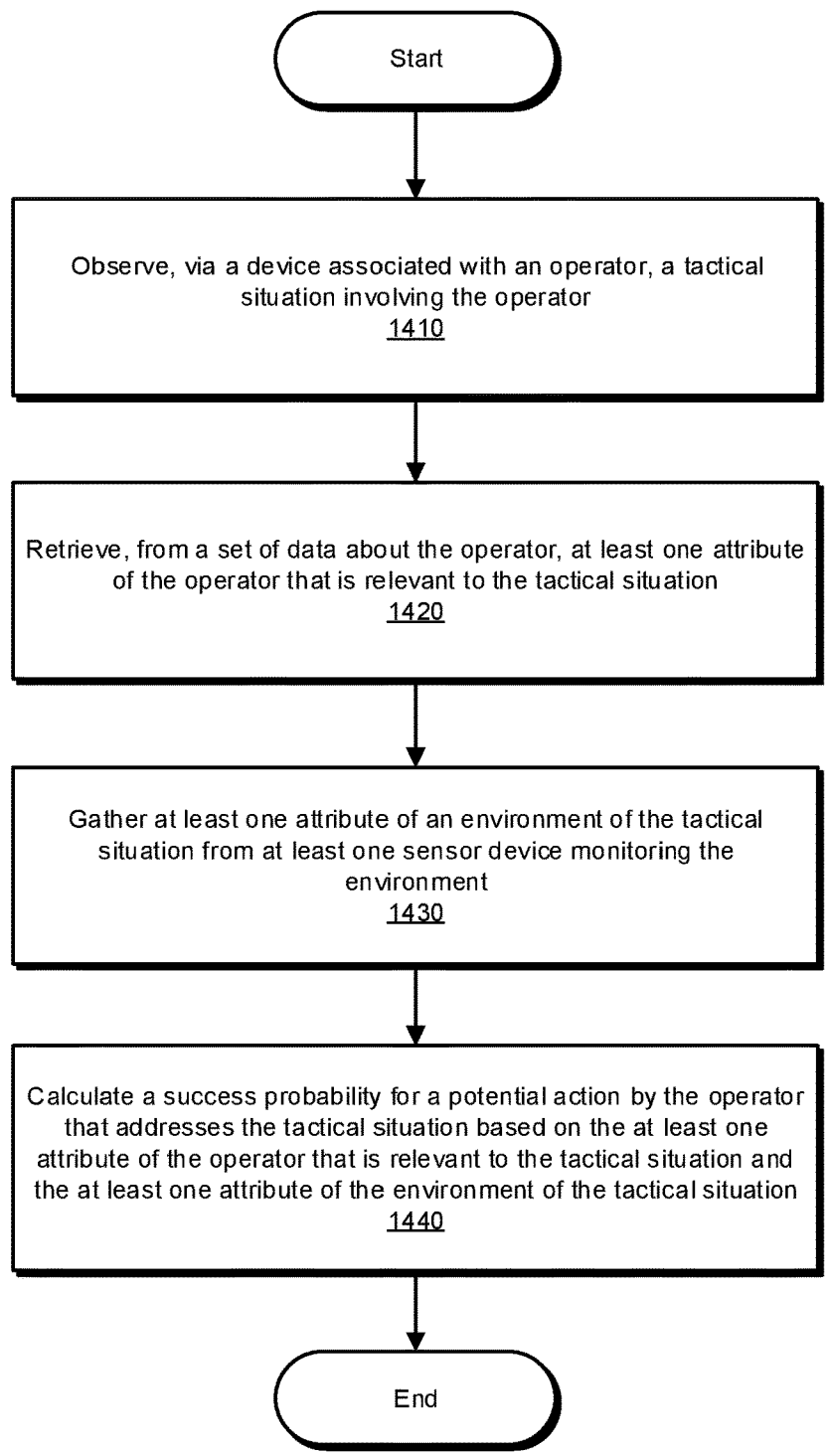
FIG. 14 is a flow diagram of an example method for addressing tactical situations via tactical devices.

FIG. 14 is a flow diagram of an example method for addressing tactical situations via tactical devices. As illustrated in FIG. 14, at step 1410, one or more of the systems described herein may observe, via a device associated with an operator, a tactical situation involving the operator. At step 1420, one or more of the systems described herein may retrieve, from a set of data about the operator, at least one attribute of the operator that is relevant to the tactical situation.

At step 1430, one or more of the systems described herein may gather at least one attribute of an environment of the tactical situation from at least one sensor device monitoring the environment. In some examples, the systems described herein may gather the at least one attribute of the environment of the tactical situation from the at least one sensor device monitoring the environment by identifying a plurality of sensor devices of a plurality of sensor device types and gathering a plurality of attributes from the plurality of sensor devices of the plurality of sensor device types. In some examples, the systems described herein may gather the at least one attribute of the environment of the tactical situation from the at least one sensor device monitoring the environment by identifying a location of an opponent of the operator.

At step 1440, one or more of the systems described herein may calculate a success probability for a potential action by the operator that addresses the tactical situation based on the at least one attribute of the operator that is relevant to the tactical situation and the at least one attribute of the environment of the tactical situation. In one embodiment, the systems described herein may recommend, via the device, that the operator perform the potential action based on the success probability for the potential action in the tactical situation. Alternatively, the systems described herein may recommend, via the device, that the operator perform an alternative action in response to determining that the success probability for the potential action in the tactical situation is lower than a success probability of the alternative action in the tactical situation.

In some examples, the systems described herein may calculate the success probability by providing the at least one attribute of the operator and the at least one attribute of the environment as input to a machine learning model and receiving the success probability as output from the machine learning model. In one embodiment, the systems described herein may (i) receive an indication from the operator of an intent to carry out the potential action, (ii) gather at least one additional attribute of the environment of the tactical situation, and (iii) recalculate the success probability based on the at least one additional attribute of the environment of the tactical situation. In some examples, the systems described herein may calculate the success probability based on the at least one additional attribute of the environment by recalculating the success probability via a model-free algorithm.

In one embodiment, the systems described herein may create, based on at least one of the at least one attribute of the operator and the at least one attribute of the environment, a recommendation for the deployment of at least one tactical resource in order to increase the success probability of the potential action and/or may provide the recommendation for deployment of the at least one tactical resource to the operator. For example, the systems described herein may create and/or recommend a flight path and/or deployment configuration for one or more drones.

In one embodiment, the systems described herein may (i) determine that the tactical situation involves a team of operators that includes the operator, (ii) retrieve, from a set of data about the team of operators, at least one attribute of the team of operators that is relevant to the tactical situation, and (iii) calculate a success probability for a potential action performed by the team of operators based on the at least one attribute of the team of operators that is relevant to the tactical situation and the at least one attribute of the environment of the tactical situation.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
observing, via a plurality of devices associated with a plurality of operators, a tactical situation involving the plurality of operators;
retrieving, from a set of data describing one or more of the plurality operators, at least one personal attribute of one or more of the operators that is relevant to the tactical situation, wherein the at least one personal attribute of one or more of the plurality of operators that is relevant to the tactical situation comprises data about historical behavior of the plurality of operators when functioning as a team;
gathering at least one attribute of an environment of the tactical situation from at least one sensor device monitoring the environment; and
calculating a success probability for a potential action by one or more of the plurality of operators that addresses the tactical situation on the at least one personal attribute of the one or more of the plurality of operators that is relevant to the tactical situation and the at least one attribute of the environment of the tactical situation.

2. The computer-implemented method of claim 1, further comprising recommending, via one or more of the plurality of devices, that one or more of the plurality of operators perform the potential action based on the success probability for the potential action in the tactical situation.

3. The computer-implemented method of claim 1, further comprising recommending, via one or more of the plurality of devices, that one or more of the plurality of operators perform an alternative action in response to determining that the success probability for the potential action in the tactical situation is lower than a success probability of the alternative action in the tactical situation.

4. The computer-implemented method of claim 1, wherein calculating the success probability comprises:

providing the at least one personal attribute of one or more of the plurality of operators and the at least one attribute of the environment as input to a machine learning model; and
receiving the success probability as output from the machine learning model.

5. The computer-implemented method of claim 1, further comprising:
receiving an indication from one or more of the plurality of operators of an intent to carry out the potential action;
gathering at least one additional attribute of the environment of the tactical situation; and
recalculating the success probability based on the at least one additional attribute of the environment of the tactical situation.

6. The computer-implemented method of claim 5, wherein recalculating the success probability based on the at least one additional attribute of the environment comprises recalculating the success probability via a model-free algorithm.

7. The computer-implemented method of claim 1, wherein gathering the at least one attribute of the environment of the tactical situation from the at least one sensor device monitoring the environment comprises:
identifying a plurality of sensor devices of a plurality of sensor device types; and
gathering a plurality of attributes from the plurality of sensor devices of the plurality of sensor device types.

8. The computer-implemented method of claim 1, further comprising:
creating, based on at least one of the at least one personal attribute of one or more of the plurality of operators and the at least one attribute of the environment, a recommendation for deployment of at least one tactical resource in order to increase the success probability of the potential action; and
providing the recommendation for deployment of the at least one tactical resource to one or more of the plurality of operators.

9. The computer-implemented method of claim 1, further comprising:
determining that the tactical situation involves a team of operators that comprises one or more of the plurality of operators;
retrieving, from a set of data about the team of operators, at least one attribute of the team of operators that is relevant to the tactical situation; and
calculating a success probability for a potential action performed by the team of operators based on the at least one attribute of the team of operators that is relevant to the tactical situation and the at least one attribute of the environment of the tactical situation.

10. A system comprising:
a mobile device that:
detects a tactical situation involving one or more of a plurality of operators;
retrieves at least one attribute of an environment of the tactical situation from at least one sensor device monitoring the environment;
identifies at least one personal attribute of one or more of the plurality of operators that is relevant to the tactical situation, wherein the at least one personal attribute of one or more of the plurality of operators that is relevant to the tactical situation comprises data about historical behavior of the plurality of operators when functioning as a team;

sends, to a server:
the at least one attribute of the environment of the tactical situation; and
at least one personal attribute of the one or more of the plurality of operators that is relevant to the tactical situation; and
receives, from the server, a success probability for a potential action in the tactical situation by one or more of the plurality of operators based on the at least one personal attribute of one or more of the plurality of operators that is relevant to the tactical situation and the at least one attribute of the environment of the tactical situation.

11. The system of claim 10, further comprising:
detecting, by the mobile device, that a connection to the server is not present; and
calculating, by the mobile device and in response to detecting that the connection to the server is not present, a low-confidence success probability for the potential action in the tactical situation by one or more of the plurality of operators based on the at least one personal attribute of one or more of the plurality of operators that is relevant to the tactical situation and the at least one attribute of the environment of the tactical situation.

12. The system of claim 10, further comprising an additional mobile device that:
receives the success probability for the potential action in the tactical situation;
outputs the success probability for the potential action in the tactical situation to a strategic decision-maker;
receives a recommendation about the potential action in the tactical situation from the strategic decision-maker; and
sends the recommendation about the potential action in the tactical situation to the mobile device.

13. The system of claim 10, further comprising a wearable device that:
monitors at least one condition of one or more of the plurality of operators that is relevant to the at least one personal attribute of one or more of the plurality of operators; and
sends information on the at least one condition of one or more of the plurality of operators to the mobile device.

14. The system of claim 10, further comprising a heads-up-display device that:
receives, from the mobile device, the success probability for the potential action in the tactical situation; and
displays, to an operator within the plurality of operators, information about carrying out the potential action in the tactical situation.

15. The system of claim 10, further comprising:
detecting, by the mobile device, at least one tactical resource available to one or more of the plurality of operators;
calculating, by the mobile device, that allocating the tactical resource to one or more of the plurality of operators will increase the success probability for the potential action; and
allocating the tactical resource to one or more of the plurality of operators in response to calculating that allocating the tactical resource to one or more of the plurality of operators will increase the success probability for the potential action.

16. The system of claim 15, wherein the tactical resource comprises one or more drones.

17. The system of claim 10, wherein the mobile device:
determines, based on the success probability for the potential action, information relevant to the potential action to be displayed to one or more of the plurality of operators; and
sends the information relevant to the potential action to be displayed on one or more wearable devices associated with one or more of the plurality of operators.

18. A system comprising:
a computing device that:
receives, from a plurality of mobile devices associated with a plurality of operators, information about a tactical situation involving the plurality of operators;
retrieves at least one attribute of an environment of the tactical situation from at least one sensor device monitoring the environment;
sends, to a server, the at least one attribute of the environment of the tactical situation;
receives, from the server, a success probability for a potential action in the tactical situation by the plurality of operators based on at least one personal attribute of one or more of the plurality of operators that is relevant to the tactical situation and the at least one attribute of the environment of the tactical situation, wherein the at least one personal attribute of one or more of the plurality of operators that is relevant to the tactical situation comprises data about historical behavior of the plurality of operators when functioning as a team; and
sends, to the plurality of mobile devices associated with the plurality of operators, instructions to carry out the potential action based at least in part on receiving, from the server, the success probability for the potential action.

19. The system of claim 18, further comprising:
detecting, by the computing device, at least one tactical resource available to the plurality of operators;
calculating, by the computing device, that allocating the tactical resource to the plurality of operators will increase the success probability for the potential action; and
allocating the tactical resource to the plurality of operators in response to calculating that allocating the tactical resource to the plurality of operators will increase the success probability for the potential action.

\* \* \* \* \*